June 18, 1940. H. M. BECHT 2,204,921
ANTISKID APPLIANCE
Filed Nov. 14, 1939 3 Sheets-Sheet 1
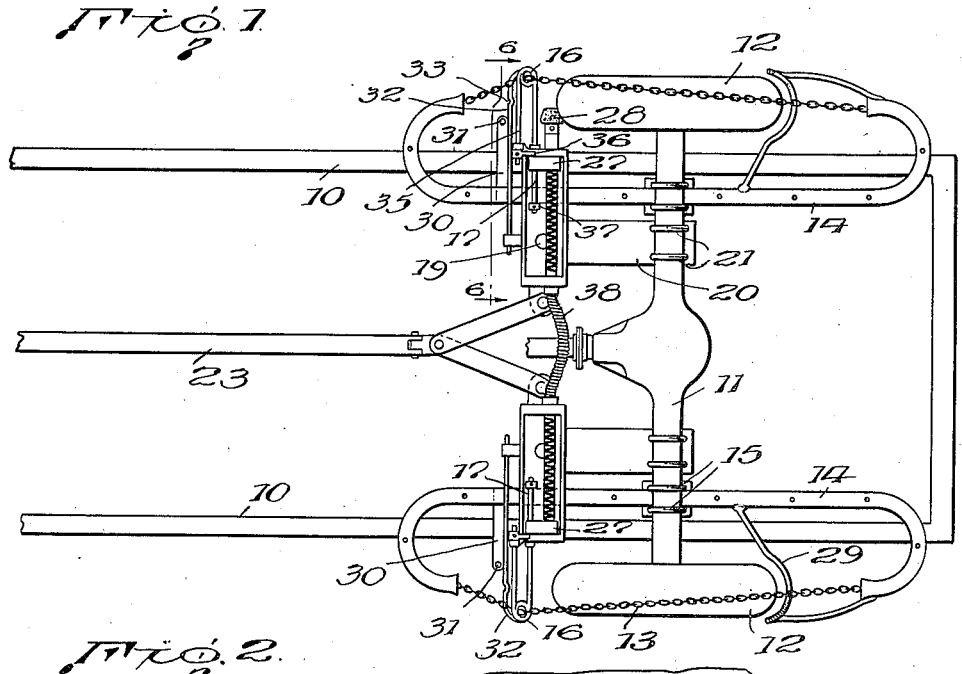
Inventor
Howell M. Becht,
By Church & Church
His Attorneys June 18, 1940.                    H. M. BECHT                    2,204,921
                              ANTISKID APPLIANCE
                            Filed Nov. 14, 1939          3 Sheets-Sheet 2
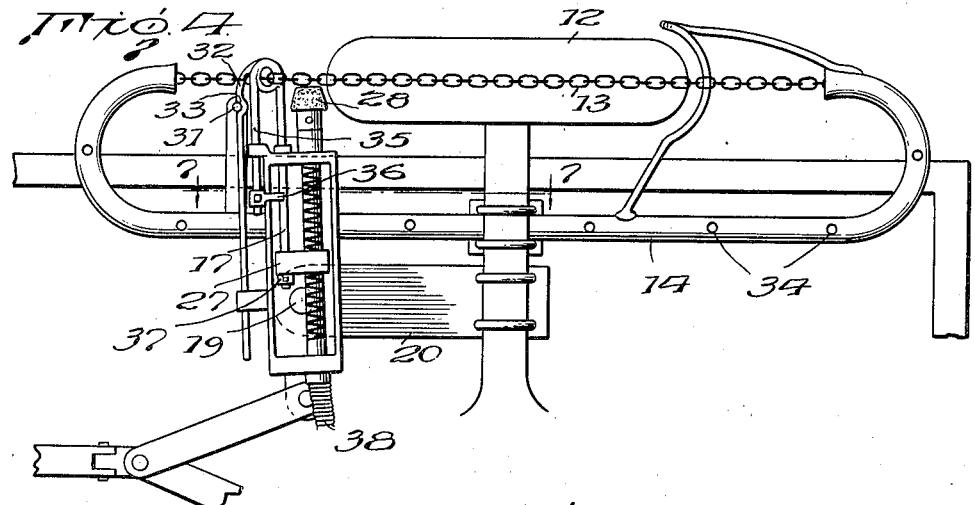
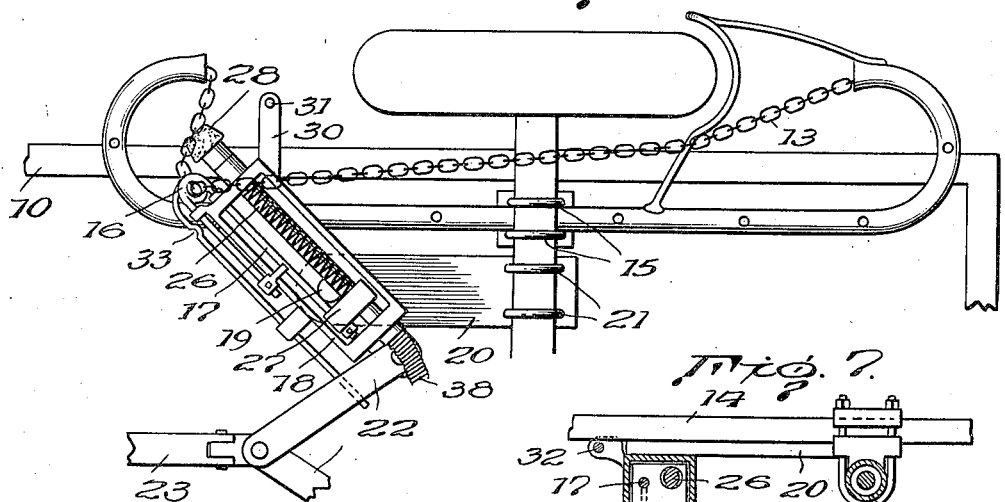
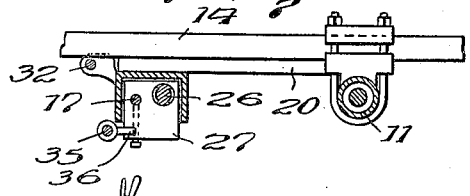
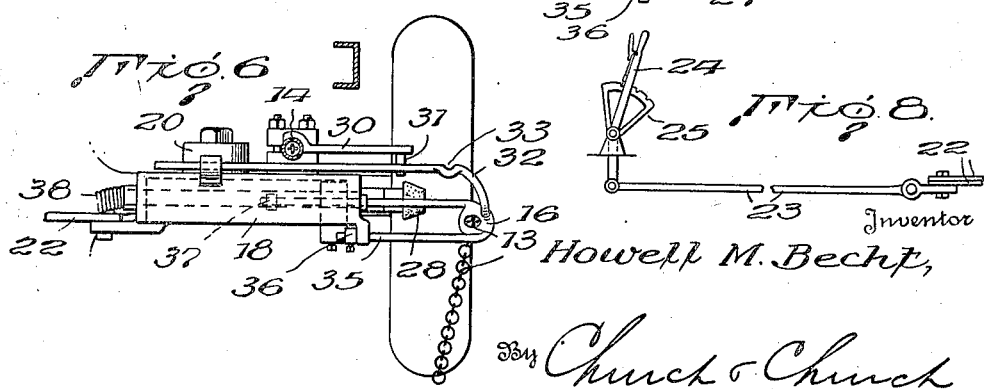
Inventor
Howell M. Becht,
By Church & Church
His Attorneys Patented June 18, 1940

2,204,921

UNITED STATES PATENT OFFICE 2,204,921

ANTISKID APPLIANCE

Howell M. Becht, Harrisburg, Pa., assignor of one-half to Alton W. Lick, Harrisburg, Pa.

Application November 14, 1939, Serial No. 304,403

18 Claims. (Cl. 188—4)

This invention relates to improvements in antiskid appliances for vehicle wheels.

The primary object of the invention is to provide an antiskid appliance for vehicle wheels which may be placed in cooperative relationship with the wheels by the vehicle operator without leaving his seat.

A further object of the invention is to provide an antiskid appliance for wheels wherein a length of an antiskid element is normally held to one side of the wheel but, when placed in use, is passed back and forth across the path of the wheel.

Still another object of the invention is to provide an antiskid appliance wherein the antiskid element is in endless form and is fed lengthwise along suitable guide means each time it passes under the wheel or between the wheel and the road surface.

A further object of the invention is to provide an antiskid appliance comprising a length of an antiskid element loosely suspended from a point at the rear of the wheel and engaged at a point in advance of the wheel by a member which can be reciprocated transversely of the wheel to move the element back and forth across the path of the wheel at a point in advance of the wheel.

Another object of the invention is to provide an antiskid element normally held out of operative relationship with the wheel, but which can be placed in operative position with respect to the wheel by the operator without the latter leaving his seat in the vehicle and which, when adjusted to its operative position, will be operative, regardless of whether the vehicle is moving forwardly or rearwardly. In this connection, the invention contemplates a device in which the length of antiskid element is suspended from a point at the rear of the wheel medial of the wheel tread and is supported in advance of the wheel by adjusting means which, normally, hold the element at the side of the wheel, but which can be actuated to move the forward portion of the element back and forth across the path of the wheel, or which can be adjusted to position the forward portion of the element also medially of the wheel tread whereby, under the latter circumstances, the length of the element between the two points of support would extend in a line disposed medially of and beneath the wheel tread.

With these and other objects in view, the invention consists in certain details of construction and combinations and arrangements of parts, all as will hereinafter be more fully described, and the novel features thereof particularly pointed out in the appended claims.

In the accompanying drawings illustrating what is believed to be the preferred embodiment of the present invention—

Figure 1 is a bottom plan view illustrating the chassis frame and rear drive wheels of a vehicle with the present appliance installed and operatively associated with the wheel, the antiskid element being shown at its outer limit of movement;

Fig. 2 is a side elevation of a portion of the rear end of a vehicle, the body of the vehicle being partially broken away for purposes of illustration;

Fig. 3 is a bottom plan view illustrating only one wheel with the antiskid appliance operatively associated therewith but with the antiskid element shown at its innermost limit of movement;

Fig. 4 is a view similar to Fig. 3, illustrating the adjustment of the antiskid element when it is operatively associated with the wheel of the vehicle for use in aiding movement of the vehicle rearwardly;

Fig. 5 is a view similar to Fig. 4, showing the antiskid element retracted, so to speak, to its inoperative position;

Fig. 6 is a front elevational view of the appliance and rear wheel, the antiskid element being in the position illustrated in Fig. 2, or in the position of its outer limit of movement;

Fig. 7 is a longitudinal sectional view on the line 7—7 of Fig. 4; and

Fig. 8 is a detail perspective view of a conventional arrangement of operating lever and connecting linkage, by which the operator can move the appliance into and out of operative relationship with the vehicle wheels.

Figure 9:
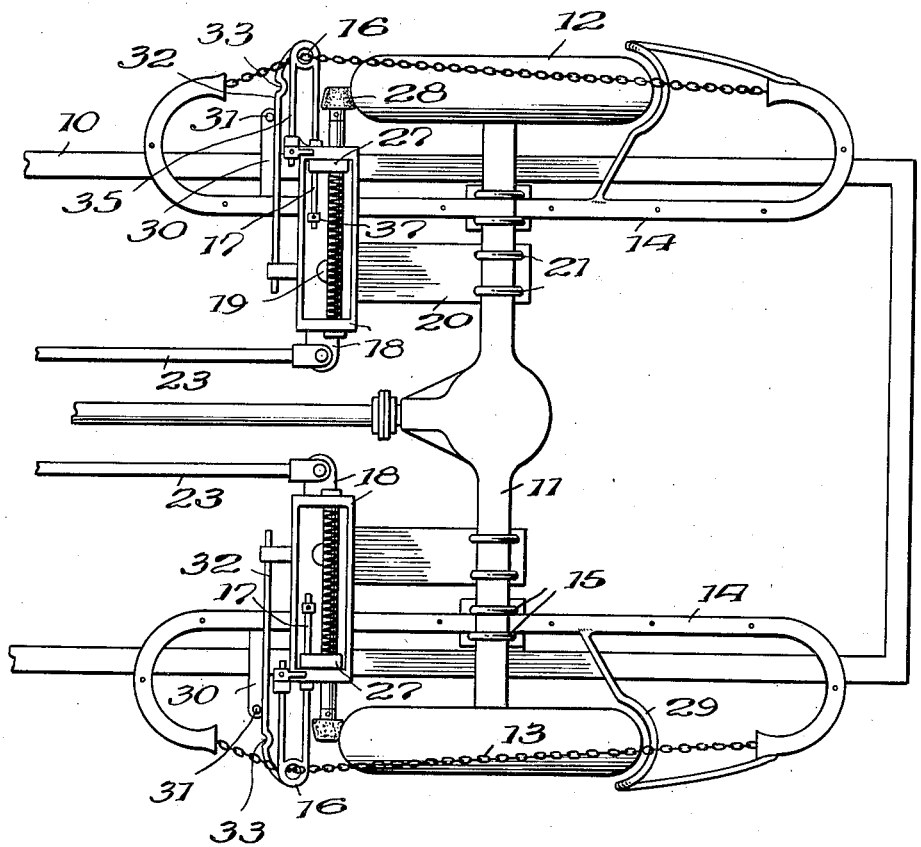
Fig. 9 is a plan view of a modified structure wherein the appliances for the two wheels of the vehicle are operable independently of one another.

The chassis frame of the vehicle is illustrated more or less in outline at 10; the usual rear axle housing at 11; and the rear wheels at 12. As previously indicated, the antiskid appliance for these wheels comprises an antiskid element, such as a chain 13, which is adapted to be moved back and forth across the path of the wheel 12 in advance of the same, so that the wheel will run across the chain each time the latter is passed across the path of the wheel. Preferably, this chain constitutes an endless member carried by suitable guide means so that, as the chain is pinched, so to speak, between the tread of the wheel and the surface of the roadway, the resultant pull on the chain will cause it to feed rearwardly with respect to the direction in which the machine is moving. For instance, this guide means may consist of a tubular member 14 suitably mounted on the under portion of the machine, it being shown as secured to the axle housing 11 by clips 15 in the present instance. This tubular guide, through a major portion of its length, extends parallel to the plane of rotation of the wheel, but its end portions are reversely bent in such manner that the terminals of the guide tube are located fore and aft of the wheel in a plane medial of the wheel tread. As will be understood, the endless length of chain 13 extends through the guide tube 14 with the exposed portion between the terminals loosely suspended therefrom.

Under normal road conditions, the chain is held toward one side, preferably inside, of the wheel, as illustrated in Fig. 5. For this purpose, the chain extends through an eye 16 carried on a rod 17 slidably mounted in a casing 18 which is capable of being moved inwardly and outwardly with respect to the wheel. When the casing is moved inwardly, the chain is retracted inwardly from the wheel, as shown in Fig. 5. Preferably, this casing 18 is pivotally mounted at 19 on a bracket 20 mounted under the car, as by being secured to the rear axle housing 11 by clips 21. Each rear wheel may be equipped with one of the present appliances and, as illustrated, each of the casings 18 has a link 22 pivotally attached to one end thereof, and the two links 22 are, in turn, pivotally connected to a rod 23 pivotally connected to an operating lever 24. This operating lever is preferably located adjacent the operator's seat so that the operator, by rocking the lever 24 may, through the bar 23 and links 22, swing the casings 18 outwardly to the position illustrated in Fig. 1. Operating lever 24 should be provided with some means for releasably retaining it in any position to which it might be adjusted, a quadrant 25 being indicated in Fig. 8 for this purpose, although other forms of holding devices may be employed in conjunction with the operating lever.

When the machine is moving forwardly, and it is desired to bring the antiskid appliance into operation, the operator, without leaving his seat, actuates lever 24 to move the casings 18 to the positions in which they are shown in Figs. 1 to 3. When first moved to these so-called operative positions, the casings are originally located as illustrated in Fig. 3. That is, with the exposed lengths of antiskid chains located somewhat inside of the medial lines of the tire treads, the wheels will not engage or at least will not pass over the chains. This engagement of the wheels with the chains is accomplished, with the present appliance, by moving the chains transversely of the wheels across the paths of the wheels. In the present, preferred embodiment of the invention, this transverse movement of the chains is accomplished by reciprocating the eyes 16, the limits of movement of the eyes being illustrated in Figs. 1 and 3. Each eye is provided with its individual reciprocating mechanism and a description of the means for reciprocating any one eye will suffice. Preferably, this reciprocatory motion is imparted to the eye and the chain by a traversing member 26, journaled in casing 18, and a block 27 threaded on said traversing member. The rod 17, extending from the eye 16, extends through one end of casing 18, which serves as a guide for a rod and, within the casing, said rod extends loosely through the traversing block 27 and has an enlargement 37 at the end thereof. Also extending inwardly from eye 16, but exteriorly of casing 18, is a second rod 35 which has an offset or enlargement 36 thereon disposed in the path of block 27. As is well understood, in traversing mechanisms of this type, the rotating member 26 is provided with continuous or connected threads of opposite pitch, with the result that, as the member is rotated, the block travels alternately in opposite directions. Rotary motion may be imparted to member 26 by means of a drive roller 28 secured thereon at a point exterior of casing 18 and adapted to contact the vehicle wheel when the casing is swung outwardly, as illustrated in Figs. 1 and 3. Thus, when the casing 18 is swung outwardly and member 26 rotated, block 27 will slide along rod 17 until it engages offset 36, whereupon eye 16 will be moved outwardly across the path of the wheel and, as block 27 returns along member 26, it will engage enlargement 37 and retract eye 16. The extreme limits of movement of eye 16 are indicated in Figs. 1 to 3.

As previously stated, the portion of the chain 13 engaged by eye 16 will be loosely suspended, particularly when the casing 18 is in its operative position and, as shown, the eye engages the chain 13 at a point between the wheel and the forward end of the guide 14. The slackness in the suspended portion of the chain is such that that portion of the chain adjacent the point of contact between the wheel and road surface rests on the road surface and, as will be apparent, movement of this portion of the chain back and forth across the path of the wheel will permit the wheel to pass over it intermittently. It will be appreciated that, as the chain is thus pinched between the wheel tread and road surface, there will be a tendency to pull the chain rearwardly with respect to the direction of movement of the vehicle. It is, primarily, for this reason that the chain is made in the form of an endless member and is supported on the vehicle in such fashion that it may feed lengthwise freely through its guide means and the eye 16.

If desired, a guard 29 may be provided between the wheel and the rear end of the guide tube 14 to prevent the chain fouling the wheel.

As it would be undesirable to swing the casing 18 inwardly away from the wheel to the inoperative position of the appliance at a time when the rod 17 and eye 16 are in their extended or outermost position, a stop is provided for preventing inward swinging movement of the casing under such conditions. For instance, there may be a stop 31 on a bracket 30, and a stop rod 32 may be secured or connected to the eye 16, the relative positions of the pin 31 and stop rod 32 being such that, when the eye 16 is in its outermost position, the rod 32 will engage against the pin 31 and prevent the casing 18 being swung inwardly. In other words, the presence of the pin 31 and stop rod 32 will require the traversing mechanism to be moved to its inner position before the operator can move operating lever 24 to retract the casing 18.

The pin 31 and stop rod 32 may also serve another useful function in connection with the use of the antiskid element when it is desired to propel the vehicle rearwardly. The reciprocatory motion of the eye 16 at a point forward of the wheel will not, of course, serve any useful purpose when the vehicle is propelled rearwardly, because this movement of the chain brings it only into contact with the wheel at a point forward of the point of contact between the wheel and road surface. Therefore, in order to use the antiskid element in propelling the vehicle rearwardly, the present appliance is so constructed as to permit the chain to be loosely suspended from points fore and aft of the wheel and medial of the tire tread, as illustrated in Fig. 4. It will be observed that the stop rod 32 is formed with a recess 33 therein and, by properly controlling the operation of the traversing mechanism, the operator can cause the desired movement to be imparted to said mechanism, including the eye 16, so as to bring the notch or recess 33 into registry with the stop pin 31, as shown in Fig. 4. With the parts so positioned with respect to one another, it will be noted that the suspended portion of the antiskid chain extending from the eye 16 rearwardly to the rear terminal of the guide tube is disposed in a line medial of the tire tread and will be retained in this position. At this time, as will also be noted, the drive roller 28 does not contact the wheel of the vehicle and, as a result, this portion of the chain will be retained in position along this line. Thus, reverse rotation of the wheel of the vehicle will be facilitated by this length of the chain being disposed beneath it. At the same time, the chain will be free to feed along its guide 14 and through the eye 16.

The casing 18 may be suitably closed to protect it against inclement weather conditions and antifriction elements may also be employed to facilitate movement of the chain through the guide tube where a tube is used for the guide means. Also, where a tube is used as guide means for the chain, it is preferably provided with a plurality of openings 34 to permit drainage.

In the present illustration, both traversing members 26 of the two rear wheels are driven from a single roller 28 by having the two members connected as, for instance, by a flexible drive connection 38, but it will be appreciated that the invention also contemplates the use of a single appliance on one wheel only or, where each rear wheel is so equipped, separate operating levers and connecting linkage may be provided for each appliance. Such an arrangement is indicated in Fig. 9 wherein a separate actuating rod 23 is provided for each appliance. In this arrangement, each rod 23 is pivotally attached at one end to one of the casings 18 and its other end is provided with an operating lever 24 such as illustrated in Fig. 8. Where separate operating connections are thus used, stop pins 31 should be provided for each stop rod 32. It will also be understood that one of the stop pins 31 and the corresponding stop rod 32 can be dispensed with, if desired, when both appliances are controlled by a single operating lever, as in the present instance because with the two appliances connected to a single connecting rod 23, it is apparent that both appliances are always in corresponding positions relatively to their respective wheels.

Described briefly, the casings 18 are normally positioned as shown in Fig. 5 but, by proper manipulation of the operating lever 24, they may be swung to the position shown in Fig. 3, at which time the drive roller 28 will be in driving contact with the wheel 12. While so held in this driving relationship, the threaded traversing members 26 cause the blocks 27 to move back and forth, thus advancing and retracting the eyes 16 transversely of the wheels to move the chains 13 back and forth across the path of the wheels in advance of the latter. This is for forward motion of the vehicle. For rearward motion of the vehicle, the casings 18 are swung to the position illustrated in Fig. 3 and the traversing members 26 operated until the notches 33 in the stop rods 32 are brought into registry with the stop pins 31, so as to position the chains along lines medial of the wheel treads as shown in Fig. 4. When thus adjusted, the operating lever is moved to slightly retract the drive roller 28 so that it will not engage the wheel. At the same time, the stop rods 32 will be moved to interlock the pins 31 and recesses 33. In actuating the traversing members 26 to move the notches 33 into registry with the stop pins 31, the operator must move the control lever back and forth so as to intermittently press the rod 32 against the pin 31 and, by his sense of feel and by the throw permitted the lever, he can tell when the pin engages in the notch.

What I claim is:

1. In an antiskid appliance for vehicle wheels, an elongated antiskid element supported at points in advance of and in rear of the wheel, and means for moving a portion of said element in advance of the wheel back and forth across the line of travel of said wheel.

2. In an antiskid appliance for vehicle wheels, an endless antiskid element supported fore and aft of the wheel, and means moving a section of said element backward and forward across the line of travel of the wheel in advance of the latter.

3. In an antiskid appliance for vehicle wheels, an endless antiskid element supported fore and aft of the wheel, and means moving a section of said element backward and forward across the line of travel of the wheel in advance of the latter, said endless element being free to feed in the direction of rotation of the wheel as it passes under said wheel.

4. In an antiskid appliance for vehicle wheels, a length of antiskid chain loosely suspended at points fore and aft of the wheel, and means operable by said wheel for moving said chain back and forth beneath the wheel.

5. In an antiskid appliance for vehicle wheels, a length of antiskid material loosely suspended at points fore and aft of said wheel, means comprising a drive roller for moving a portion of said antiskid element back and forth beneath the wheel, and means for moving said roller into and out of contact with said wheel.

6. In an antiskid appliance for vehicle wheels, a length of antiskid material, a fixed support for said antiskid element at the rear of said wheel, a traversing member movable back and forth across the line of travel of the wheel at a point in advance of said wheel, and means carried by said traversing member for loosely supporting said antiskid element.

7. In an antiskid appliance for vehicle wheels, an endless antiskid element, guide means in which a portion of said element is supported, said element being loosely suspended from the terminals of said guide means at points fore and aft of said wheel, and means engageable with said element at a point in advance of the wheel for moving the loosely suspended portion thereof back and forth across the path of said wheel, said element being free to feed longitudinally of the vehicle in said guide means.

8. In an antiskid appliance for vehicle wheels, an elongated, endless antiskid element, means for loosely suspending said element at points fore and aft of said wheel and said element being free to feed through said suspension means, adjusting means engageable with the suspended portion at a point in advance of the wheel and normally supporting said element at a point spaced inwardly from the wheel, and means for reciprocating said adjusting means laterally of the wheel between points located at opposite sides of said wheel.

9. In an antiskid appliance for vehicle wheels, an elongated, endless antiskid element, means for loosely suspending said element at points fore and aft of said wheel and said element being free to feed through said suspension means, adjusting means engageable with the suspended portion at a point in advance of the wheel and normally supporting said element at a point spaced inwardly from the wheel, and means operable by said wheel for reciprocating said adjusting means laterally of the wheel between points located at opposite sides of said wheel.

10. In an antiskid appliance for vehicle wheels, an elongated, endless antiskid element, means for loosely suspending said element at points fore and aft of said wheel and said element being free to feed through said suspension means, adjusting means engageable with the suspended portion at a point in advance of the wheel and normally supporting said element at a point spaced inwardly from the wheel, and means comprising a drive roller movable into and out of contact with said wheel for reciprocating said adjusting means laterally of the wheel between points located at opposite sides of said wheel.

11. In an antiskid appliance for vehicle wheels, an elongated antiskid element, means loosely suspending a portion of said element at points fore and aft of said wheel, adjusting means engageable with said element between said wheel and said forward point of suspension, said adjusting means being pivoted to swing inwardly from said wheel, means for advancing and retracting said adjusting means laterally of the wheel to and from a point outside said wheel, and means for preventing an inward swinging movement of said adjusting means when the latter is in its advanced position outside said wheel.

12. In an antiskid appliance for vehicle wheels, an elongated antiskid element loosely suspended at points fore and aft of said wheel, an eye member through which said element extends at a point in advance of the wheel, and means for reciprocating said eye member transversely of the wheel to move that portion of said element which is in advance of the wheel back and forth across the path of the wheel.

13. In an antiskid appliance for vehicle wheels, an elongated antiskid element loosely suspended at points fore and aft of said wheel, an eye member through which said element extends at a point in advance of the wheel, means for reciprocating said eye member transversely of the wheel to move that portion of said element which is in advance of the wheel back and forth across the path of the wheel, and means for moving said eye member inwardly from the wheel to position said element along the inner side of but spaced from said wheel.

14. In an antiskid appliance for vehicle wheels, a guide tube adapted to be positioned alongside of said wheel with its ends terminating fore and aft of the wheel, an endless antiskid element carried in said tube with a portion of said element loosely suspended from the ends of the tube, means for normally holding the suspended portion of the element to one side of the wheel, and means for reciprocating said holding means transversely of the wheel in advance of the latter.

15. In an antiskid appliance for vehicle wheels, guide means disposed longitudinally of the line of travel of the wheel, the terminals of said guide means being located fore and aft of the wheel, an endless antiskid element carried by said guide means with a portion of said element suspended from the terminals of the guide means, and means for moving that portion of the element located between the wheel and forward terminal of the guide means back and forth across the path of the wheel.

16. In an antiskid appliance for vehicle wheels, guide means disposed longitudinally of the line of travel of the wheel with the terminals thereof located fore and aft of the wheel, an endless antiskid element carried by said guide means with a portion thereof loosely suspended from the terminals of said guide means, a reciprocatory member through which said element extends at a point in advance of the wheel, means for reciprocating said member transversely of the wheel to move said element back and forth across the path of the wheel, and means for moving said reciprocating means inwardly from the wheel to position said element out of the path of the wheel.

17. In an antiskid appliance for vehicle wheels, an elongated antiskid element, means for loosely suspending said element from points fore and aft of said wheel, the point of suspension at the rear of the wheel being located substantially medial of the wheel tread, and means engageable with said element intermediate the wheel and the forward point of suspension for loosely supporting the forward portion of said element at a point medial of the wheel tread.

18. In an antiskid appliance for vehicle wheels, guide means adapted to be positioned parallel to the line of travel of the wheel with the terminals of said guide means located fore and aft of the wheel, the rear terminal being also located at a point substantially medial of the wheel tread, an endless antiskid element carried by said guide means with a portion of the element loosely suspended from the terminals of the guide means, adjusting means in advance of the wheel for normally holding said loosely suspended portion of the element to one side of the wheel, and means for moving said adjusting means to position the same at a point medial of the wheel tread in advance of the wheel whereby that portion of the element extending rearwardly from the adjusting means to the rear terminal of the guide means will be positioned in a line medial of the wheel tread.

HOWELL M. BECHT.